Nov. 28, 1967  A. W. R. ALLCOCK  3,355,125

FLAP SYSTEMS FOR AIRCRAFT

Filed Oct. 21, 1965

Alastair William Rodney Allcock
*Inventor*

By Stevens, Davis, Miller & Mosher  *Attorneys*

3,355,125
FLAP SYSTEMS FOR AIRCRAFT
Alastair William Rodney Allcock, Northwood, England, assignor to Power Jets (Research and Development) Limited, London, England
Filed Oct. 21, 1965, Ser. No. 499,239
Claims priority, application Great Britain, Dec. 11, 1964, 50,618/64
3 Claims. (Cl. 244—42)

ABSTRACT OF THE DISCLOSURE

An aircraft wing flap in which air is blown over the upper surface from a nozzle located in the wing to which the flap is attached, said flap being provided with a discontinuity in its surface which acts to separate flow over the flap to cause drag and loss of lift. The discontinuity, which may be in the form of a step, is shrouded by the wing trailing edge during the normal range of flap operation, and becomes exposed only when the flap is turned beyond this range. A duct is formed between the nose of the flap and the wing trailing edge and is closed by the step.

---

The present invention relates to flap systems for aircraft and in particular aircraft in which provision is made for discharging gaseous fluid rearwardly as long thin streams along the span of the wings or other lifting surfaces in such a way as to modify the pressure distribution around the surfaces.

Such aircraft include those fitted with blown flaps and those operating on the "jet flap" principle. In the former case air is blow over a surface of a flap to entrain the airflow over the surface and increase the lift obtainable by reducing the possibility of aerodynamic flow breakaway when the flap is deflected.

In a jet flap aircraft a propulsion jet stream is discharged over the upper surface of a trailing edge wing flap disposed to guide the jet stream on a path following said upper surface and moveable to deflect the stream from the rearward direction. The stream will not only thus produce forward thrust but will have an effect analogous to that of a conventional trailing edge wing flap and give rise to a substantial increase in wing lift. Examples of jet flap aircraft are disclosed in prior British patent specifications 787,012, 787,013 and 921,013.

A jet or blown flap when in a neutral (or up) position generally has low drag and when in the deflected position tends to develop lift. These are undesirable characteristics after landing or after abandonment of take-off, particularly if still subjected to air or gas flow, which additionally is likely to produce a substantial thrust, since they militate against rapid deceleration of an aircraft.

The invention is directed to a flap system which can be arranged to produce high drag and low lift.

A flap system according to the invention comprises a flap mounted for movement relative to a lifting surface, a discontinuity in the surface of the flap and means for shielding the discontinuity from fluid flow over the flap.

In a preferred form of the invention the system further comprises a nozzle arranged to direct a fluid stream over the flap.

According to a feature of the invention the discontinuity may be exposed to fluid flow by movement of the flap.

Various embodiments of the invention will now be described by way of example with reference to the accompanying diagrammatic drawings of which:

Figure 1:
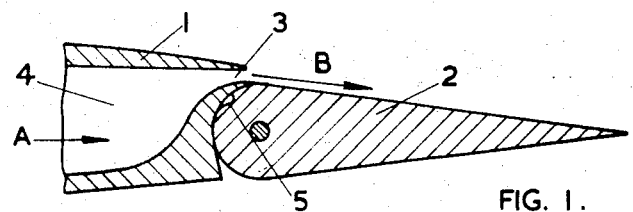
FIGURE 1 is a sectional view of part of an aircraft wing with a flap attached in the neutral position.

Referring to FIGURE 1, an aircraft wing 1 has flap 2 pivoted behind its trailing edge so that the flap when in a neutral position as shown forms in effect a rearward extension of the wing. The trailing edge of the wing is shaped to enclose the nose of the flap and act as a shroud.

The upper surface of the wing is spaced above that of the flap to form a rearwardly directed nozzle 3 extending along the span of the wing and connected to an internal duct 4 to which compressed air is supplied from a suitable source.

It is envisaged that the invention might be applied to a jet flap aircraft as described in the previously mentioned prior specification No. 921,013 in which case the source of compressed air would be the by-pass compressors of the jet propulsion engines used therein.

Air flowing through the duct in the direction of the arrow A is discharged from the nozzle as a narrow stream over the upper surface of the flap as indicated by arrow B.

When the flap is turned about its pivot the air stream will continue to flow over the upper surface of the flap and will be deflected from the rearward direction thus modifying the circulation around the wing.

The nose of the flap is formed with a notch 5 which extends along the span of the flap and serves to interrupt the otherwise smooth surface. The notch is so situated that it will be shielded by the wing shroud when the flap is in the neutral position or until turned downwards to a desired angle, say about 60°, corresponding to the normal range of flap operation.

Figure 2:
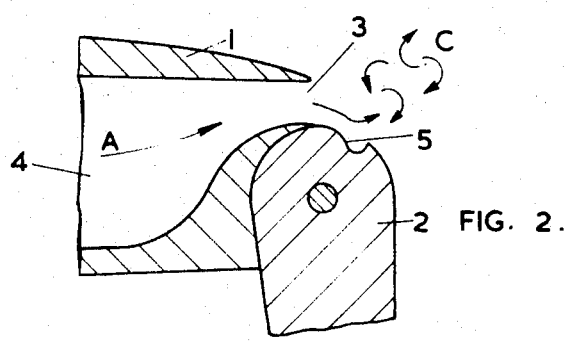
FIGURE 2 is another view showing the flap in a deflected position.

Beyond this angle the notch will be exposed to the air stream from the nozzle (or the normal airflow over the wing if there is no discharge from the nozzle) as shown in FIGURE 2 to cause flow separation over the erstwhile upper surface of the flap resulting in loss of lift and thrust spoiling.

The turbulent flow induced is a considerable source of drag in itself while the reduction of lift on the flap causes the latter to act as an airbrake. The overall lift reduction also increases the effectiveness of normal wheel braking.

Figure 3:
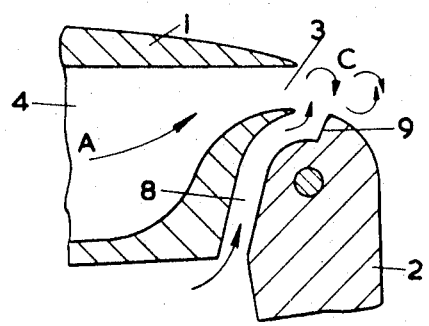
FIGURE 3 is a view corresponding to FIGURE 2 of another alternative arrangement.

FIGURE 3 shows a variation wherein part of the nose of the flap is cut away to form a duct 8 between the flap and the wing shroud when the flap is in the extreme downwards position. In the normal operating range this duct is closed off by step 9 which acts as a "drag trigger" in similar fashion to the arrangements of the previous examples when the flap is turned to the said extreme position. In this case aerodynamic flow is bled from the wing undersurface and also serves to augment the separation and thrust spoiling effects.

In another arrangement (not illustrated) a small-chord plate forming part of the nose of the flap is hinged along its forward edge parallel to the flap axis and spring-loaded. This would normally be constrained by the shroud but when the flap is turned to an extreme position as previously mentioned would be released to project into the nozzle flow thus acting as a spoiler. On turning the flap in an upwards direction the shroud would act on the plate against the spring and return the plate to its retracted position.

In all cases the "drag trigger" is arranged to operate beyond the normal range of flap operation and some flap control limitation capable of being overcome only when desired would be provided. Certain prior specifications, including Nos. 787,012 and 787,013, relate to jet flap aircraft in which turbine efflux is directed over a flap in place of compressed air as aforementioned. In an application of the present invention to these cases it might be desirable that the flap be constructed in accordance with prior British patent specification No. 904,788.

We claim:
1. A flap system for an aircraft having an aerofoil comprising a flap pivoted behind the trailing edge of the aerofoil, the upper surface of the aerofoil being raised relative to that of the flap to define a rearwardly directed nozzle extending spanwise along the trailing edge of the aerofoil; a connection between the nozzle and a fluid pressure source, the upper surface of said flap being exposed both to normal aerodynamic flow and to fluid flow discharged by the nozzle; a flow channel between the trailing edge of the aerofoil and the leading edge of the flap and defined at least in part by the flap; and a discontinuity formed in the surface of the leading edge of said flap, and adapted, during a predetermined range of flap angles, to close off flow through said channel and, during another range of flap angles, to permit flow through said channel and to initiate aerodynamic separation of the flow at the leading edge of said flap.

2. A flap system according to claim 1, wherein said discontinuity cooperates with said trailing edge of said aerofoil to close off flow through said channel.

3. A flap system according to claim 1, wherein said discontinuity is in the form of a step.

References Cited

UNITED STATES PATENTS

| | | | |
|---|---|---|---|
| 1,422,616 | 7/1922 | Page | 244—42 |
| 1,945,254 | 1/1934 | Bittner | 244—42 |
| 2,120,568 | 6/1938 | Nazir | 244—42 |
| 2,271,763 | 2/1942 | Fowler | 244—42 |
| 2,276,522 | 3/1942 | Staufer | 244—42 |
| 2,406,922 | 1/1946 | Stalker | 244—42 |
| 2,609,165 | 9/1952 | Hill | 244—42 |
| 2,836,380 | 5/1958 | Pearson | 244—42 |
| 2,890,843 | 6/1959 | Attinello | 244—42 |
| 2,920,844 | 1/1960 | Marshall et al. | 244—42 |
| 3,123,322 | 3/1964 | Jackson et al. | 244—42 |
| 3,188,021 | 6/1965 | Young | 244—42 |

MILTON BUCHLER, *Primary Examiner.*

B. BELKIN, *Assistant Examiner.*